(12) United States Patent
Schnitzspan et al.

(10) Patent No.: US 10,729,517 B2
(45) Date of Patent: Aug. 4, 2020

(54) ASCERTAINING THE SPATIAL POSITIONS AND ORIENTATIONS OF IMPLANTS ANCHORED IN A JAW OF A PATIENT

(71) Applicant: DENTSPLY SIRONA inc., York, PA (US)

(72) Inventors: Paul Schnitzspan, Frankfurt (DE); Volker Wedler, Hirschberg (DE)

(73) Assignee: DENTSPLY SIRONA Inc., York, PA (US)

( * ) Notice: Subject to any disclaimer, the term of this patent is extended or adjusted under 35 U.S.C. 154(b) by 0 days.

(21) Appl. No.: 15/537,198

(22) PCT Filed: Dec. 18, 2015

(86) PCT No.: PCT/EP2015/080466
§ 371 (c)(1),
(2) Date: Jun. 16, 2017

(87) PCT Pub. No.: WO2016/097279
PCT Pub. Date: Jun. 23, 2016

(65) Prior Publication Data
US 2017/0348072 A1 Dec. 7, 2017

(30) Foreign Application Priority Data
Dec. 18, 2014 (DE) .................. 10 2014 226 497

(51) Int. Cl.
*A61C 8/00* (2006.01)
*A61C 13/00* (2006.01)
*A61C 9/00* (2006.01)

(52) U.S. Cl.
CPC .......... *A61C 8/0001* (2013.01); *A61C 8/0022* (2013.01); *A61C 8/0074* (2013.01);
(Continued)

(58) Field of Classification Search
CPC ... A61C 8/0001; A61C 8/0022; A61C 8/0074; A61C 9/004; A61C 13/0004
See application file for complete search history.

(56) References Cited

U.S. PATENT DOCUMENTS 5,350,297 A 9/1994 Cohen
6,769,913 B2 * 8/2004 Hurson ................ A61C 8/0001
433/172
(Continued)

FOREIGN PATENT DOCUMENTS

WO 2004100822 A2 11/2004
WO 2014144098 A1 9/2014

OTHER PUBLICATIONS

International Search Report; PCT/EP2015/080466; Mar. 9, 2016 (completed); dated Mar. 17, 2016.
(Continued)

*Primary Examiner* — Heidi M Eide
*Assistant Examiner* — Drew S Folgmann
(74) *Attorney, Agent, or Firm* — DENTSPLY SIRONA Inc.

(57) ABSTRACT

A method is proposed for ascertaining the spatial positions and orientations of at least two implants anchored in a jaw of a patient, said method having the following steps: 1. An adhesive bond aid is produced that bridges the implants and has negative molds of adhesive caps, wherein the negative molds fit on the adhesive caps if these are affixed to the implants, and wherein the negative molds allow a clearance relative to the adhesive caps. 2. The adhesive caps are affixed to the at least two implants in the jaw of the patient. 3. The adhesive bond aid is positioned over the adhesive caps. 4. The clearance between the adhesive caps and the negative molds is filled with adhesive. 5. The adhesive is
(Continued)

cured. 6. The adhesive caps are released from the implants.
7. The obtained adhesion key is removed from the patient.

9 Claims, 1 Drawing Sheet

(52) U.S. Cl.
CPC .......... *A61C 9/004* (2013.01); *A61C 13/0003* (2013.01); *A61C 13/0004* (2013.01); *A61C 9/0006* (2013.01)

(56) References Cited

U.S. PATENT DOCUMENTS

| | | | | |
|---|---|---|---|---|
| 6,951,460 | B2* | 10/2005 | Halldin | A61C 8/0001 433/173 |
| 2002/0106610 | A1* | 8/2002 | Hurson | A61C 8/0001 433/173 |
| 2003/0082499 | A1* | 5/2003 | Halldin | A61C 8/0001 433/173 |
| 2005/0032018 | A1* | 2/2005 | White | A61C 9/0006 433/41 |
| 2013/0172731 | A1* | 7/2013 | Gole | A61B 5/0035 600/424 |

OTHER PUBLICATIONS

International Preliminary Report on Patentability; PCT/EP2015/080466; Mar. 9, 2016 (completed); dated Mar. 17, 2016.
Written Opinion of the International Search Report; PCT/EP2015/080466; Mar. 9, 2016 (completed); dated Mar. 17, 2016.

\* cited by examiner

ASCERTAINING THE SPATIAL POSITIONS AND ORIENTATIONS OF IMPLANTS ANCHORED IN A JAW OF A PATIENT

TECHNICAL FIELD

The invention relates to a method for ascertaining the spatial positions and orientations, relative to one another, of at least two implants anchored in a jaw of a patient. The invention further relates to an adhesive bond aid for bridging at least two implants anchored in a jaw of a patient; a system for ascertaining the spatial positions and orientations, relative to one another, of at least two implants anchored in a jaw of a patient; an associated computer program; as well as a device for producing the adhesive bond aid. This is important in dental technology in the production of restorations or dental prostheses that are supported by multiple implants.

BACKGROUND OF THE INVENTION

[A] dental prosthesis that is borne by implants must fit very precisely on these implants, since germs may accumulate in potentially present interstices between implant and dental prosthesis, which may lead to inflammation (peri-implantitis). In the manufacturing of the dental prosthesis, there are some sources of error that are relevant to this:

- In taking impressions and the production of a plaster model (master model) for the adaptation by a dental technician of a restoration to be created, systematic transfer errors arise, which turn out to be larger or smaller, depending upon the thoroughness of the treating dentist and upon the materials used.
- Additional errors and inaccuracies may occur upon scanning in the master model for creating restorations by means of CAD/CAM. However, these errors can be minimized via the use of special scanners having especially high precision.
- An alternative procedure, in which a virtual master model is created by means of an intra-oral scan, likewise causes inaccuracies—especially, due to the technical limitations of the available intra-oral scan technology.

Nevertheless, for the creation of restorations that are respectively installed on a single implant, it can be ensured relatively well that the restoration precisely fits on the implant.

However, with multi-element, implant-borne restorations, i.e., restorations that are installed on more than one implant, these errors have severe effects. Namely, the precise relative position, and, especially, also the relative orientation, of the implants here depend upon this, so that no gaps can arise between the implants and the restorations. In such a case, the restoration must possibly even be completely recreated. Many dental laboratories have therefore moved to guaranteeing the fit only for the master model, and making no guarantee as to the fit in the mouth of the patient.

SUMMARY OF THE INVENTION

It is the object of the invention to minimize the transfer and scanning errors in implant treatments with more than one implant.

This object is achieved by the subject matter of the independent claims. Advantageous developments of the subject matter of the independent claims are characterized in the dependent claims. The wording of all the claims is hereby included in the content of this description by way of reference.

Individual method steps will be described in greater detail in the following. The steps do not necessarily need to be performed in the indicated sequence, and the method to be described can also have additional steps which are not mentioned.

A method is proposed for ascertaining the spatial positions and orientations, relative to one another, of at least two implants anchored in a jaw of a patient, said method having the following steps:

1. Production of a connecting piece (adhesive bond aid) that bridges the implants, wherein the adhesive bond aid is designed such that the adhesive bond aid has negative molds of connection pieces (adhesive caps), wherein the negative molds are arranged in the adhesive bond aid such that they fit on the adhesive caps if said adhesive caps are affixed to said implants so as to be releasable, and wherein the negative molds are further formed in the adhesive bond aid such that they allow a clearance between the negative molds and the adhesive caps. It is important in this connection that the adhesive bond aid be rigid and cannot be deformed. The adhesive bond aid thereby does not need to be extremely precise, but rather need only fit approximately on the implants; the negative molds thus do not need to have precisely the conical shape of the adhesive caps, but rather may be cylindrical in shape, for example. The clearance thereby does not need to be so large that it can compensate for the potentially present imprecision in form of the adhesive bond aid.

2. The adhesive caps are affixed to the at least two implants in the jaw of the patient so as to be releasable. For example, this occurs in that they are screwed either directly onto the implants or onto potentially present abutments to the implant.

3. The adhesive bond aid is positioned over the adhesive caps in the patient's mouth. Thanks to the large clearance, the adhesive bond aid fits in every instance, and the dentist has space to work.

4. The clearance between the adhesive caps and the negative molds is filled with dental adhesive.

5. The adhesive is cured.

6. The adhesive caps are released from the implants or the potentially present abutments.

7. The adhesive bond aid, with the adhesive caps adhering to it, is removed from the patient's mouth. These parts form what is known as the adhesion key.

An adhesion key is, therefore, present that contains the correct spacings and, especially, orientations of the implants relative to one another. Using this adhesion key, in the production of restorations that rest upon multiple implants, it can be ensured that the implant arrangement is correctly transferred into the mouth of the patient.

The bearing and orientation relative to adjacent teeth are ensured in that, given existing neighboring teeth, a negative mold of the occlusal faces of the neighboring teeth is present in the adhesive bond aid. With these negative molds, the adhesive bond aid is supported in the neighboring teeth.

A second master model that avoids the aforementioned inaccuracies with regard to the position and orientation of the implants is obtained in that the following steps are subsequently implemented:

1. Laboratory analogs or implants are affixed, so as to be releasable, to the adhesive caps adhering to the adhesive bond aid. They are therefore arranged at the correct spacing relative to one another, and with the correct orientation.

2. A model is generated that comprises the laboratory analogs or implants. For example, this occurs in that the laboratory analogs or implants are cast in a plaster base. The precise gingiva curve in this connection does not necessarily need to be modeled.

3. The adhesive caps are released from the laboratory analogs or implants, which remain in the model.

If the second master model is to be present virtually, e.g., because the restoration is to be created by means of CAD/CAM, the following steps are instead subsequently implemented:

1. The adhesive bond aid, with the adhesive caps adhering to it, is scanned with high precision. For this, a suitable extra-oral scanner is used, wherein a single image accuracy of between 5 and 30 µm should be achieved.

2. A virtual three-dimensional model is created from the scanned data.

It is advantageous for a data medium on which the obtained data are stored to be created as an additional step.

If the dental technician who creates the restoration works with traditional methods, the following methods are implemented beforehand:

1. Creation of a master model with laboratory analogs or implants.

2. Affixing scan bodies to the laboratory analogs or implants. These are typically pyramidal and enable a scanner to ascertain at least the rough position and orientation of the laboratory analogs or implants.

3. Scanning of the master model.

4. Creation of a virtual, three-dimensional model from the scanned data. The adhesive bond aid is then created by means of CAD/CAM, starting from this virtual, three-dimensional model.

If, by contrast, the dental technician—and the treating dentist—preferably operates digitally, the following steps are implemented beforehand:

1. Affixing scan bodies to the implants in the mouth of the patient.

2. Implementation of an intra-oral scan.

3. Creation of a virtual, three-dimensional model from the scanned data. A virtual master model is therefore present. The adhesive bond aid is then created by means of CAD/CAM, based upon this virtual, three-dimensional model. It is here especially advantageous that a visit to the dentist may normally be spared.

The clearance between the adhesive caps and the negative molds is preferably between 100 and 300 µm.

It is advantageous for the negative molds in the adhesive bond aid to respectively have a hole in the occlusal direction for receiving the dental adhesive and for releasing the adhesive caps. It is thereby made possible to add the adhesive after the adhesive bond aid has been positioned on the adhesive caps, which, especially, also facilitates the dosing of the adhesive. Either a channel from the hole to the screw, with which the respective adhesive cap is affixed to the associated implant, may thereby be kept free by means of a wax crayon, or this channel is subsequently drilled clear, in order to be able to release the screw.

In an advantageous development, multi-unit abutments are affixed to the implants so as to be releasable, to which multi-unit abutments the adhesive caps are for their part affixed so as to be releasable.

The object is also achieved via a method for creating a dental prosthesis that is to be anchored in a patient's mouth by means of at least two, already-present implants. The spatial positions and orientations of the at least two, already-present implants are thereby initially ascertained relative to one another. This step is implemented as already described above. The dental prosthesis is then created based upon the ascertained positions and orientations. The dental prosthesis that is thus obtained fits precisely, without gaps or the like, on the implants (or on the multi-unit abutments, in the event that these are provided).

In addition to this, an adhesive bond aid for bridging at least two implants anchored in a jaw of a patient is proposed. This adhesive bond aid has negative molds of connection pieces (adhesive caps), wherein these negative molds are arranged in the adhesive bond aid such that they fit on the adhesive caps, if the adhesive caps are affixed to the implants so as to be releasable. The negative molds in the adhesive bond aid are further designed such that they allow a clearance between the negative molds and the adhesive caps.

Moreover, a system is proposed for ascertaining the spatial positions and orientations, relative to one another, of at least two implants anchored in a jaw of a patient, said system having an adhesive bond aid as described above and having an adhesive cap for each implant.

The object is further achieved via a computer program that can control a milling machine or a 3-D printer in a workflow at a processing unit, a microcontroller, DSP, FPGA, or computer, or at a multitude of these in a network, such that the milling machine or the 3-D printer produces an adhesive bond aid as described above.

Furthermore, a device for producing an adhesive bond aid as described above is proposed, having a scanner or a camera for recording the position and orientation data of the implants, a milling machine or a 3-D printer, and a computer program as described above. The milling machine or 3-D printer thereby has a controller that can be controlled by the computer program such that the milling machine creates the adhesive bond aid based upon the position and orientation data.

Additional details and features are found in the following description of preferred exemplary embodiments, in conjunction with the dependent claims. The respective features can be implemented by themselves, or severally in combination with each other. The possibilities for solving the problem are not restricted to the exemplary embodiments. For example, the ranges always comprise all—uncited—intermediate values and all conceivable partial intervals.

BRIEF DESCRIPTION OF THE DRAWINGS

An exemplary embodiment is schematically portrayed in the FIGURE. In particular.

DETAILED DESCRIPTION OF THE INVENTION

Figure 1:
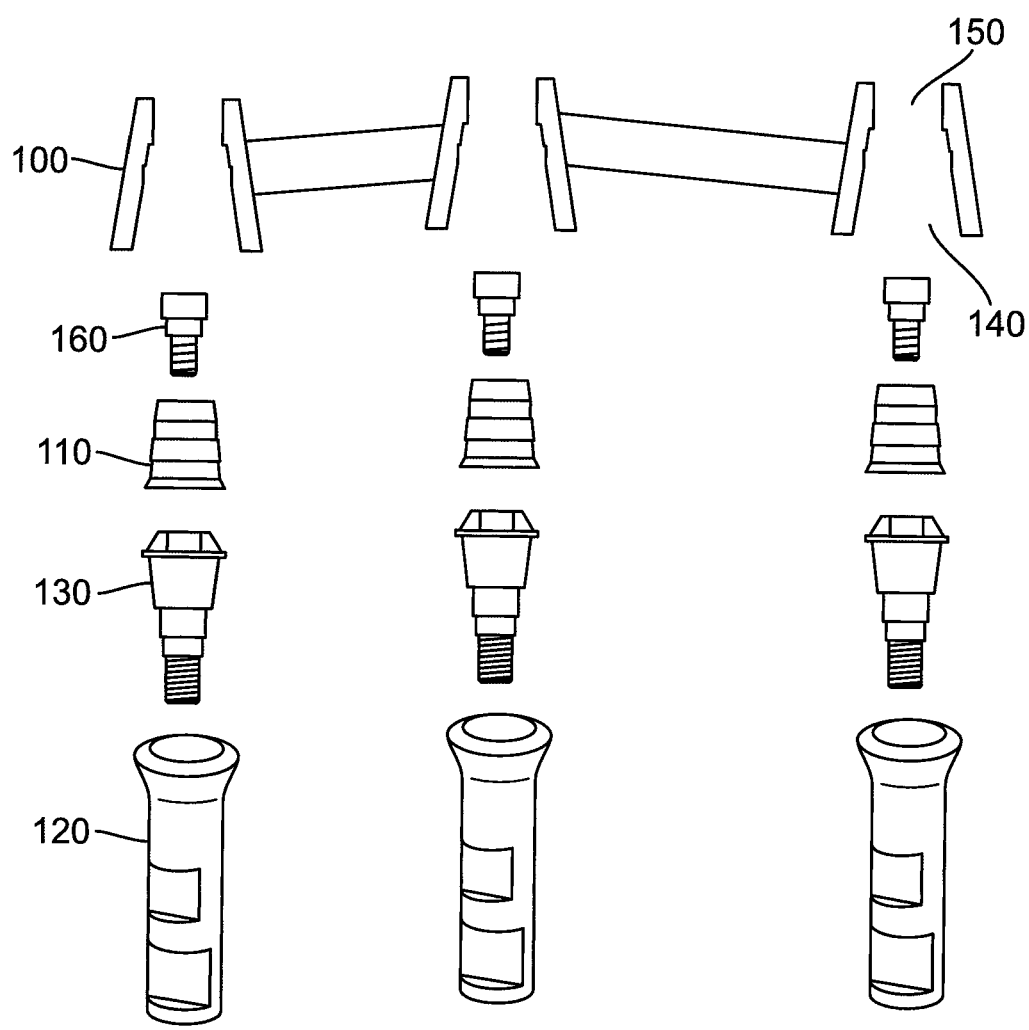
FIG. 1 shows a schematic depiction of the parts that are used in a method according to the invention.

If a CAD/CAM-based implant treatment is created, at the same time, what is known as an adhesive bond aid 100 is then created, as it is schematically apparent in FIG. 1. This adhesive bond aid serves the dentist in positioning what are known as adhesive caps 110 relative to one another in the patient's mouth and in joining them to an adhesion key with the adhesive bond aid 100. This adhesion key now contains the implant bearings/positions correlated perfectly to one another. With the aid of this adhesion key, the dental technician creates a new master model with laboratory analogs (the gingiva does not need to be modeled exactly). This master model deals solely with the implant positions. The positions and orientations of the laboratory analogs in the new master model now correspond exactly to the situation of the implants in the patient's mouth, and the transfer errors of the implant bearings and the scan errors are eliminated. In detail, the procedure appears as follows:

1. With regard to an implant treatment, the dentist, together with the dental technician, decides upon multiple implants 120 to be cemented on multi-unit abutments 130.

2. The dentist takes an impression of the patient situation and sends this to the laboratory.

3. The technician creates a master model with laboratory analogs. This master model includes a system-dependent transfer error, i.e., the position and orientation of the laboratory analogs do not correspond 100% to those of the implants 120 in the patient's mouth.

4. The master model is scanned with scan bodies on the laboratory analogs and is thereby digitized. An error may thereby be created due to inaccuracy in the scanning.

5. The dental technician creates the restoration on the digitized model by means of CAD; however, this is not yet milled/ground by means of CAM.

6. Instead of this, what is known as the adhesive bond aid 100 is created simultaneously. This may appear similar to the definitive treatment; it is important only that the adhesive bond aid 100 have a negative mold 140 of what are known as the adhesive caps 110 instead of the implants. This negative mold 140 is created with an extremely large clearance, and a large hole 150 in the occlusal direction is left open.

7. The adhesive bond aid 100, together with the adhesive caps 110 and multi-unit abutments 130, is sent to the dentist.

8. The multi-unit abutments 130 are screwed into the implants 120 in the patient's mouth.

9. The adhesive caps 110 are screwed 160 onto the multi-unit abutments 130 in the patient's mouth.

10. In the patient's mouth, the adhesive bond aid 100 is positioned over the adhesive caps 110; due to the extremely large clearance, there are no fit problems, and the dentist has sufficient space to work.

11. The holes 150 and the interstices between adhesive caps 110 and adhesive bond aid 100 are filled with a matching dental adhesive, and this is cured. The adhesion key with the perfect patient situation has thereby now been assembled.

12. The adhesion key, together with the multi-unit abutments 130, is again sent to the laboratory.

13. The technician now creates the second master model (without exact gingiva contour). The multi-unit abutments 130 are screwed into the adhesion key 160 (the multi-unit abutments fit into the adhesive caps 110 in the adhesion key). The laboratory analogs are screwed into the adhesion key at the multi-unit abutments 130. A plaster base is now cast that comprises the laboratory analogs, and the second master model is finished.

14. The adhesion key is released from the second master model (the multi-unit abutments remain in the model).

15. The adhesion key may be destroyed, or the adhesive caps 110 may be released from the key and cleaned for further use.

16. The definitive restoration is now produced by means of CAD/CAM; the negative molds 140 of the adhesive caps 110 are again produced with a clearance (which, however, no longer needs to be extremely large).

17. At the same time, the cleaned adhesive caps 110 are screwed onto the second master model (onto the multi-unit abutments 130).

18. The restoration is now cemented onto the adhesive caps 110 on the second master model.

Glossary

Abutment, Multi-Unit Abutment

"Abutment" designates the connecting part between a dental implant and the prosthetic treatment (the visible dental crowns). It forms the sensitive transition through the peri-implant soft tissue—the gingival margin—to the oral cavity and to the implant supra-construction, with which a perio-integration is to be achieved. Abutments are typically made of titanium, aluminum oxide ceramic, or zirconium oxide ceramic. They may be designed as a releasable or conditionally—or unconditionally—releasable connection.

Dental Adhesive

Adhesive suitable for dental medical use, i.e., especially for intra-oral use (presenting no health risk). It is typically a fast-curing, two-component adhesive.

Adhesive Bond Aid

Connecting piece that helpfully bridges at least two implants. It is not thereby the dental prosthesis; the precise outer shape of the connecting part therefore plays no role. The adhesive bond aid normally consists of PMMA plastic and has, at the corresponding locations, negative molds with large clearance for connection pieces (adhesive caps).

Implant

A dental implant—also simply called an "implant" here—is an alloplastic, ready-made part introduced into the jawbone. Via their usability as a support for dental prostheses, dental implants take on the function of artificial tooth roots. For this, they are either screwed or plugged into the jawbone by means of screw threading. Within 3 to 6 months, they bond with the surrounding bone to form a permanent support unit having extremely high load capacity (osseo-integration).ABS are typically comprised of titanium. (According to http://de.wikipedia.org/wiki/Zahnimplantat).

Adhesive Caps

Adhesive caps are connection parts which may be affixed to the implants (or to potentially present, multi-unit abutments) so as to be releasable in a defined and reproducible manner. These typically have a conical shape and enable parts to be glued on (thus, non-releasably) and subsequently released, together with the adhesive caps, from the implants (or multi-unit abutments).

Adhesion Key

What is to be understood by an adhesion key is a composite part that is comprised of an adhesive bond aid and the adhesive caps permanently glued thereon.

Laboratory Analog

Cost-effective part that is used in the master model instead of an expensive implant. The connection geometry for the dental prosthesis coincides with that of the implant; however, the other structure and the material do not.

Master Model

Model of the bite of a patient (or of a portion thereof) that a dental technician produces in order to adapt thereto a restoration to be created. The model is typically cast in plastic with the aid of an impression produced by the dentist. However, other materials are also conceivable; the master model can possibly even exist purely in virtual form.

Restoration, Treatment, Dental Prosthesis

The terms restoration, treatment, and dental prosthesis are used synonymously. These are here dental prostheses that, for example, may be affixed to implants and are to complete an incomplete or damaged bite.

The invention claimed is:

1. Method for ascertaining the spatial positions and orientations, relative to one another, of at least two implants anchored in a jaw of a patient, said method comprising the steps of:
   producing an adhesive bond aid that bridges releasably affixed adhesive caps of the at least two implants;
   wherein the adhesive bond aid has negative molds of the releasably affixed adhesive caps;
   positioning the adhesive bond aid over the releasably affixed adhesive caps in the patient's mouth, wherein the negative molds are arranged in the adhesive bond aid such that the negative molds fit on the releasably affixed adhesive caps while said releasably affixed adhesive caps are releasably affixed to the at least two implants in the jaw of the patient so as to form clearances between the negative molds and the releasably affixed adhesive caps;
   filling the clearances between the releasably affixed adhesive caps and the negative molds with dental adhesive by passing said dental adhesive from an occlusal direction through respective holes of the adhesive bond aid in order to occupy said clearances between the releasably affixed adhesive caps and the negative molds of the adhesive bond aid;
   curing the adhesive;
   detaching the releasably affixed adhesive caps from the at least two implants;
   removing the adhesive bond aid, with the releasably affixed adhesive caps adhering to the adhesive bond aid, from the patient's mouth,
   wherein the releasably affixed adhesive caps are affixed to the at least two implants by screws, and
   obtaining information about the relative spatial positions and orientations of the at least two implants from the adhesive bond aid and
   creating a dental prosthesis based on the obtained information.

2. Method according to claim 1,
   wherein the following steps are performed to create the adhesive bond aid:
      creating a master model with laboratory analogs or implants;
      affixing scan bodies to the laboratory analogs or implants;
      scanning of the master model; and
      creating a virtual three-dimensional model from the scanned data;
   wherein the adhesive bond aid is produced by means of CAD/CAM based on the virtual three-dimensional model.

3. Method according to claim 1, further comprising;
   releasably affixing laboratory analogs or laboratory implants to said releasably affixed adhesive caps adhering to the adhesive bond aid,
   generating a master model that includes the laboratory analogs or laboratory implants,
   releasing the laboratory analogs or laboratory implants from the adhesive caps,
   scanning the adhesive bond aid with the releasably affixed adhesive caps adhering to the adhesive bond aid, and
   creating a virtual three dimensional model from the scanned data.

4. Method according to claim 3, further comprising the step of storing the obtained scanned data on a data medium.

5. Method according to one of claim 1, wherein the following steps are performed to create the adhesive bond aid:
   affixing scan bodies to the implants in the mouth of the patient;
   performing an intra-oral scan; and
   creating a virtual three-dimensional model from the scanned data;
   wherein the adhesive bond aid is produced by means of CAD/CAM based on the virtual three-dimensional model.

6. Method for ascertaining the spatial positions and orientations, relative to one another, of at least two implants anchored in a jaw of a patient, said method comprising the steps of:
   producing an adhesive bond aid that bridges releasably affixed adhesive caps of the at least two implants;
   wherein the adhesive bond aid has negative molds of the releasably affixed adhesive caps;
   positioning the adhesive bond aid over the releasably affixed adhesive caps in the patient's mouth, wherein the negative molds are arranged in the adhesive bond aid such that the negative molds fit on the releasably affixed adhesive caps while said releasably affixed adhesive caps are releasably affixed to the at least two implants in the jaw of the patient so as to form clearances between the negative molds and the releasably affixed adhesive caps;
   filling the clearances between the releasably affixed adhesive caps and the negative molds with dental adhesive by passing said dental adhesive from an occlusal direction through respective holes of the adhesive bond aid in order to occupy said clearances between the releasably affixed adhesive caps and the negative molds of the adhesive bond aid;
   curing the adhesive;
   detaching the releasably affixed adhesive caps from the at least two implants; and
   removing the adhesive bond aid with the releasably affixed adhesive caps adhering to the adhesive bond aid from the patient's mouth,
   wherein the following steps are performed to create the adhesive bond aid:
      creating a master model with laboratory analogs or implants;
      affixing scan bodies to the laboratory analogs or implants;
      scanning of the master model; and
      creating a virtual three-dimensional model from the scanned data;
   producing the adhesive bond aid by means of CAD/CAM on the basis of the created virtual three-dimensional model.

7. Method for ascertaining the spatial positions and orientations, relative to one another, of at least two implants anchored in a jaw of a patient, said method comprising the steps of:
   producing an adhesive bond aid that bridges releasably affixed adhesive caps of the at least two implants;
   wherein the adhesive bond aid has negative molds of the releasably affixed adhesive caps;
   positioning the adhesive bond aid over the releasably affixed adhesive caps in the patient's mouth, wherein the negative molds are arranged in the adhesive bond aid such that the negative molds fit on the releasably affixed adhesive caps while said releasably affixed adhesive caps are releasably affixed to the at least two implants in the jaw of the patient so as to form a-clearances between the negative molds and the releasably affixed adhesive caps;

filling the clearances between the releasably affixed adhesive caps and the negative molds with dental adhesive by passing said dental adhesive from an occlusal direction through respective holes of the adhesive bond aid in order to occupy said clearances between the releasably affixed adhesive caps and the negative molds of the adhesive bond aid;

curing the adhesive;

detaching the releasably affixed adhesive caps from the at least two implants; and removing the adhesive bond aid with the adhesive caps adhering to the adhesive bond aid from the patient's mouth, wherein the following steps are performed to create the adhesive bond aid:

affixing scan bodies to the implants in the mouth of the patient;

performing an intra-oral scan; and creating a virtual three-dimensional model from the scanned data;

producing the adhesive bond aid by means of CAD/CAM on the basis of the created virtual, three-dimensional model.

8. Method according to claim 7, wherein the clearance between the releasably affixed adhesive caps and the negative molds is between 100 and 300 μm.

9. Method according to claim 7, further comprising the step of releasably affixing releasably affixed abutments to the at least two implants, to which the releasably affixed adhesive caps are configured to be detachably affixed to the releasably affixed abutments.

* * * * *